(12) United States Patent
Gonzalez Bautista et al.

(10) Patent No.: US 12,134,393 B2
(45) Date of Patent: Nov. 5, 2024

(54) DEVICE FOR PREDICTIVELY CONTROLLING THE MOVEMENT OF A MOTOR VEHICLE

(71) Applicant: RENAULT s.a.s., Boulogne-Billancourt (FR)

(72) Inventors: David Gonzalez Bautista, Saint Cyr l'Ecole (FR); Vicente Milanes, Boulogne-Billancourt (FR)

(73) Assignee: AMPERE s.a.s., Boulogne-Billancourt (FR)

( * ) Notice: Subject to any disclaimer, the term of this patent is extended or adjusted under 35 U.S.C. 154(b) by 211 days.

(21) Appl. No.: 17/639,149

(22) PCT Filed: Sep. 3, 2020

(86) PCT No.: PCT/EP2020/074644
§ 371 (c)(1),
(2) Date: Feb. 28, 2022

(87) PCT Pub. No.: WO2021/043925
PCT Pub. Date: Mar. 11, 2021

(65) Prior Publication Data
US 2022/0324466 A1    Oct. 13, 2022

(30) Foreign Application Priority Data

Sep. 3, 2019  (FR) ...................................... 1909681

(51) Int. Cl.
*B60W 50/00* (2006.01)
*B60W 10/18* (2012.01)
(Continued)

(52) U.S. Cl.
CPC ........ *B60W 50/0097* (2013.01); *B60W 10/18* (2013.01); *B60W 10/20* (2013.01);
(Continued)

(58) Field of Classification Search
CPC .... B60W 10/18; B60W 10/184; B60W 10/20; B60W 2050/0031; B60W 2420/403;
(Continued)

(56) References Cited

U.S. PATENT DOCUMENTS 8,706,460 B2 *  4/2014  Falangas ................ G05B 17/02
                                                          701/4
11,155,258 B2 * 10/2021  Bush ....................... G06N 20/00
(Continued)

FOREIGN PATENT DOCUMENTS

DE         102017205508 A1 * 10/2018 ............ B60W 10/06

OTHER PUBLICATIONS

International Search Report issued Nov. 26, 2020 in PCT/EP2020/074644, filed on Sep. 3, 2020, 2 pages.
(Continued)

*Primary Examiner* — Babar Sarwar
(74) *Attorney, Agent, or Firm* — Oblon, McClelland, Maier & Neustadt, L.L.P.

(57) ABSTRACT

A device for controlling the movement of a motor vehicle, including a longitudinal controller and a lateral controller which are capable of generating, from first information relating to the road layout and second information relating to the dynamic behaviour of the vehicle, control commands intended for actuators for controlling the longitudinal and lateral movement of the vehicle. The device includes a prediction model which is supplied with the first and second information and is capable of determining future states of the vehicle for future positions of the vehicle over a plurality of iterations defining a future road portion. The model is connected to a module for determining whether driving limit values are violated, which module is capable of determining, for each future state, whether one of the state variables (Continued)

defining the future state reaches or exceeds a driving limit value, and of deducing a future risk situation.

6 Claims, 4 Drawing Sheets

(51) Int. Cl.
| | |
|---|---|
| *B60W 10/20* | (2006.01) |
| *B60W 30/12* | (2020.01) |
| *B60W 30/18* | (2012.01) |
| *B60W 40/072* | (2012.01) |
| *B60W 40/114* | (2012.01) |
| *B60W 50/08* | (2020.01) |
| *B60W 60/00* | (2020.01) |
| *G06V 20/56* | (2022.01) |

(52) U.S. Cl.
CPC ...... *B60W 30/12* (2013.01); *B60W 30/18145* (2013.01); *B60W 40/072* (2013.01); *B60W 40/114* (2013.01); *B60W 50/085* (2013.01); *B60W 60/0016* (2020.02); *G06V 20/588* (2022.01); *B60W 2050/0031* (2013.01); *B60W 2420/403* (2013.01); *B60W 2510/207* (2013.01); *B60W 2520/12* (2013.01); *B60W 2520/14* (2013.01); *B60W 2540/18* (2013.01); *B60W 2552/30* (2020.02); *B60W 2552/53* (2020.02)

(58) Field of Classification Search
CPC ....... B60W 2510/20; B60W 2510/207; B60W 2520/12; B60W 2520/14; B60W 2540/18; B60W 2552/30; B60W 2552/53; B60W 30/02; B60W 30/12; B60W 30/18145; B60W 40/072; B60W 40/114; B60W 50/0097; B60W 50/085; B60W 60/0016; G06V 20/588

See application file for complete search history.

(56) References Cited

U.S. PATENT DOCUMENTS

| | | | |
|---|---|---|---|
| 2003/0070851 A1* | 4/2003 | Winner | G01S 13/72 180/167 |
| 2015/0158487 A1* | 6/2015 | Siedersberger | B60W 50/0097 701/1 |
| 2015/0203215 A1* | 7/2015 | Falangas | G06F 30/20 703/2 |
| 2017/0015288 A1* | 1/2017 | Coelingh | B60W 50/02 |
| 2017/0168485 A1* | 6/2017 | Berntorp | G01C 21/26 |
| 2017/0247032 A1* | 8/2017 | Lee | B60W 30/12 |
| 2017/0297568 A1* | 10/2017 | Kentley | G05D 1/0291 |
| 2018/0017971 A1* | 1/2018 | Di Cairano | B62D 15/0265 |
| 2018/0074505 A1* | 3/2018 | Lv | B60W 60/00272 |
| 2018/0088582 A1* | 3/2018 | Kong | B60W 50/0097 |
| 2018/0164825 A1* | 6/2018 | Matus | B60W 30/00 |
| 2018/0284775 A1* | 10/2018 | Brettschneider | B60W 10/18 |
| 2018/0292831 A1 | 10/2018 | Kong et al. | |
| 2019/0106118 A1* | 4/2019 | Asakura | B60W 30/182 |
| 2019/0286926 A1* | 9/2019 | Miura | G06V 20/588 |
| 2020/0041997 A1* | 2/2020 | Tuukkanen | A61B 5/024 |
| 2020/0255033 A1* | 8/2020 | Matsunaga | B60W 30/18145 |

OTHER PUBLICATIONS

French Preliminary Search Report issued May 13, 2020 in French Application 19 09681, filed on Sep. 3, 2019, 8 pages.

* cited by examiner

DEVICE FOR PREDICTIVELY CONTROLLING THE MOVEMENT OF A MOTOR VEHICLE

The present invention relates to a device for controlling the movement of a motor vehicle.

The invention is applicable to the field of automated driving of a vehicle, which involves, in particular, functions of keeping the vehicle in its traffic lane, controlling the speed and steering of the vehicle. The automated driving of a vehicle aims, in particular, to improve the safety and efficiency of movements. It is based in particular on active safety systems, incorporating driving assistance systems that are designed to modify the dynamic behavior of the vehicle in a critical situation like ESP (electronic stability program), which performs a function of controlling and stabilizing the trajectory of a motor vehicle, in particular via braking actions. For example, when a motor vehicle takes a bend at too high a longitudinal speed, it may be difficult to follow the curvature of the road and the motor vehicle may begin to understeer. The ESP system then automatically intervenes so as to keep the vehicle on the trajectory desired by the driver. Generally, if the vehicle deviates from a trajectory desired by the driver, the ESP system will send motor/engine torque and/or braking torque setpoint signals in order to correct the trajectory of the vehicle.

Automated driving is also based on the implementation of preventive safety systems, which seek to anticipate dangerous situations while performing a preventive action. Regarding lateral control assistance, mention may be made, for example, of lateral control assistance systems for keeping to the lane (LKA, or lane keeping assist), which are capable of controlling both steering and braking commands.

These systems provide good performance in ensuring the stability of the vehicle's trajectory when the driver performs poor maneuvers, such as, for example, attempting speeds higher than an authorized threshold in turns or rapid changes in direction.

However, driver assistance systems such as ESP see their performance decrease when implemented in vehicles with fully automated driving because then there is no departure from the linear region of operation of the system. A typical case is that of a vehicle in fully automated driving mode which is approaching a tight turn without information on maximum speed; the lane keeping system will detect the lane boundaries, and so the vehicle will continue on its trajectory in autonomous mode. However, without information on the speed, the vehicle may then drive much faster than the maximum speed for this turn, as it is too late for the ESP system to bring the vehicle back stably.

Document KR100851120 describes a lane following system for a motor vehicle. This system is based on a steering control algorithm for controlling the vehicle through a combination of steering and braking commands. It comprises a set of onboard sensors for measuring the steering angle, yaw rate, acceleration, and speed of the vehicle. It also comprises a state observer which makes it possible, on the basis of a vehicle trajectory control model, to estimate non-measurable state variables of the vehicle, so as to supply a feedback and feedforward steering control module. In particular, the observer is used to estimate the lateral speed and steering angle values for the steering wheel in order to calculate the information needed to supply the vehicle steering control module. The system is also composed of a camera for detecting lane ground markings. This camera is associated with a computing module for providing lane detection information comprising information on the curvature of the trajectory.

The steering control module makes it possible to control actuators of the system for electronically regulating the dynamic behavior of the vehicle, in particular a steering actuator of the vehicle steering system and a braking actuator, on the basis of the information provided by the vehicle's onboard sensors, information provided by the observer and lane detection information, so as to share driving tasks with the driver of the vehicle.

The commands on the steering and braking actuators are calculated on the basis of lateral and longitudinal errors while estimating non-measurable variables. This system therefore provides real-time driving assistance for the driver, but does not allow prediction of what the vehicle can or cannot do in the future. Indeed, by definition, the driver's actions do not exist yet. In reality, it is a question of a direct action that is repeated in each iteration over time, by comparing the current behavior of the vehicle with respect to the detected curvature value of the trajectory and acting, on the basis of this comparison, on the ESP system associated with the rear wheels.

However, particularly in the case of vehicles with fully automated driving, the system must be able to react when confronted with unstable situations in which the vehicle's physical boundaries may be reached. A typical example is a tight turn where the vehicle may enter at much too high a speed given the physical limits dictated by the grip between the tires and the ground in the turn.

Thus, there is a need, in the context of implementing automated driving capabilities in vehicles, to be able to anticipate future states of the vehicle in which the vehicle's stability limits might be exceeded, allowing suitable safety strategies to be adopted in advance.

To that end, the invention relates to a device for controlling the movement of a motor vehicle on a road, comprising a module for managing at least one driving assistance system, in particular of ESP type, an onboard device for detecting the ground markings for traffic lanes, capable of providing first information relating to the road layout according to the detected markings, a set of onboard measurement sensors capable of providing second information relating to the dynamic behavior of the vehicle, a device for controlling the longitudinal movement of the vehicle and a device for controlling the lateral movement of the vehicle, which are capable of generating, from the first and second information, control commands for the longitudinal movement and for the lateral movement sent to actuators for longitudinal and lateral control of the steering system of the vehicle, characterized in that it comprises a model for predicting the dynamic behavior of the vehicle supplied with the first and second information, which is capable of determining a set of future states of the vehicle corresponding to future positions of the vehicle over a plurality of iterations defining an upcoming road portion, said prediction model being connected to a module for determining the violation of vehicle driving limit values, which is capable of determining, for each determined future state, if at least one of the state variables defining said future state of the vehicle reaches or exceeds a vehicle driving limit value, and of inferring therefrom an upcoming risk situation for the vehicle for at least one future state of the vehicle.

Thus, by virtue of this arrangement, the vehicle model is able to predict future positions of the vehicle in autonomous mode over the entire trajectory ahead thereof, in order to be able to identify future positions corresponding to situations in which vehicle driving limit values are violated and to make decisions in advance in order to prevent these situations.

Advantageously, the model for predicting the dynamic behavior of the vehicle receives as input predicted control commands for the actuators of the vehicle delivered by a regulator equivalent to the devices for controlling the longitudinal movement and the lateral movement of the vehicle, state variables of the future state of the vehicle determined during a current iteration, and its current states, which are the lateral position of the vehicle, the lateral speed of the vehicle, the yaw angle and the yaw rate of the vehicle.

Advantageously, the module for determining the violation of the vehicle driving limit values includes, among the parameters defining a vehicle driving limit value, physical parameters relating to said actuators and/or to the dynamics of the vehicle.

Preferably, said parameters comprise at least a maximum steering angle value, a maximum steering wheel angle speed value, a value representative of a maximum braking capability and a value representative of a maximum acceleration capability of the vehicle.

Advantageously, said module for determining the violation of the vehicle driving limits is designed to compare the determined future states of the vehicle with respect to the vehicle driving limit values and to generate an alert signal as soon as at least one of the state variables defining these future states reaches the corresponding driving limit value.

Advantageously, the module for managing the driving assistance system is designed to receive said generated alert signal and, upon receiving said alert signal, to control an anticipatory corrective action for said state variable.

Advantageously, said anticipatory corrective action comprises a braking and/or steering action.

The invention also relates to a motor vehicle comprising a device as described above.

Other features and advantages of the present invention will become more clearly apparent from reading the following description, given by way of illustrative and non-limiting example and with reference to the appended drawings.

Figure 1:
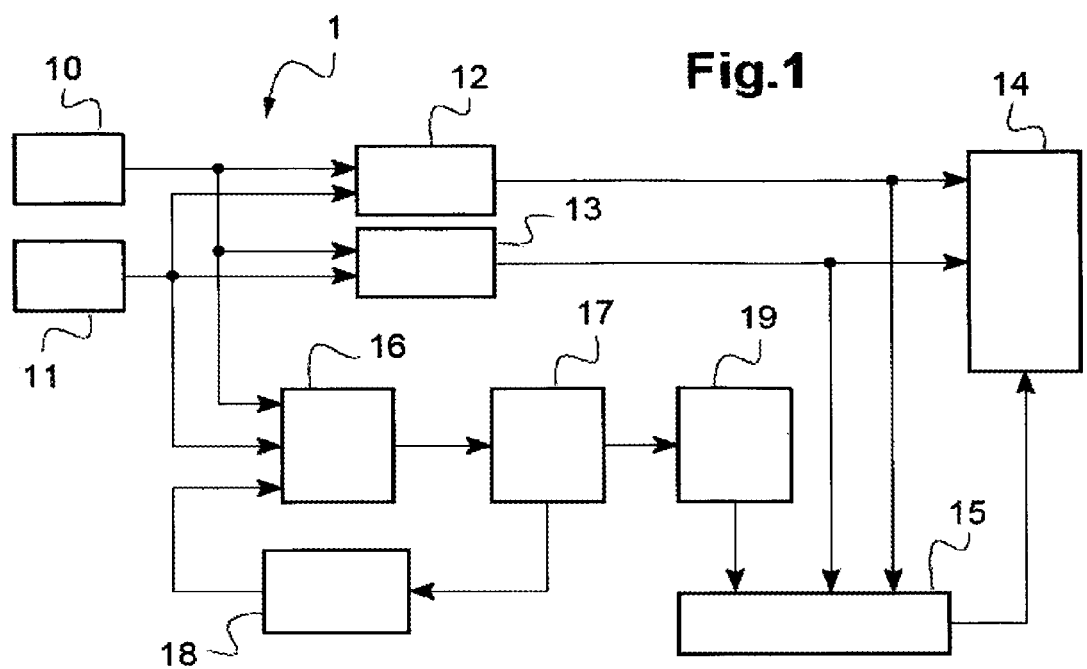
FIG. 1 is a diagram illustrating an architecture of the control device of the invention.

With reference to FIG. 1, the device 1 for controlling the movement of the vehicle comprises an onboard device 10 for detecting traffic lane ground markings. This is typically an onboard camera oriented forward with respect to the motor vehicle, for example installed at the top of the windshield, at the junction with the vehicle's roof, or installed behind the vehicle's interior rearview mirror so as to be able to acquire images of the scene ahead of the vehicle and to be able to detect the road markings ahead of the motor vehicle. To do this, the camera is associated with a processing unit, which takes the image stream provided by the camera and analyzes it using image processing techniques, to detect in particular the road marking lines on the ground along the traffic lane followed by the vehicle. The processing unit is also designed to provide information relating to the road layout based on the detected markings, in particular the number of lanes, the width of the shoulders, the lateral deviation in the direction of the middle lane, and a curvature profile of the trajectory.

The vehicle is also equipped with a set of onboard sensors 11, arranged on various items of vehicle equipment (steering wheel, steering, brakes, etc.) which are able to provide information relating to the dynamic behavior of the vehicle, in particular information such as speed, heading angle, acceleration, yaw rate of the vehicle, etc.

The information relating to road layout and the information relating to the dynamic behavior of the vehicle are delivered to a device 12 for controlling the longitudinal movement of the vehicle, or longitudinal controller, and to a device 13 for controlling the lateral movement of a vehicle, or lateral controller, which are capable of generating, from this information, at each iteration point, commands for controlling longitudinal movement and lateral movement to actuators 14, in particular at least one vehicle longitudinal control actuator and at least one steering actuator of the vehicle steering system, so as to make it possible to steer the vehicle in autonomous mode, that is to say without actions from the driver, for example by applying a control strategy for following the middle lane. Thus, for the longitudinal positioning of the vehicle, the device 12 for controlling the longitudinal movement of the vehicle is used to control vehicle braking and acceleration actuators. For the lateral positioning of the vehicle, the device 13 for controlling the lateral movement of the vehicle is used to control actuators for controlling the steering angle of the wheels.

These two control devices 12 and 13 implement regulators that use the following input/output variables: current vehicle speed, current vehicle acceleration, desired vehicle speed at the given iteration point, desired vehicle acceleration at the given iteration point, current yaw rate, desired yaw rate at the given iteration point, current vehicle heading error, current vehicle lateral error.

The outputs of the control devices 12 and 13 are then used in a module 15 for managing the driving assistance systems of the vehicle, in particular an ESP system, with which the vehicle is equipped. These systems are therefore feedback-controlled just using information from the sensors, which ensures only reactive-type assistance. There is currently no system capable of indicating the vehicle driving limits for the upcoming road portion. In other words, these systems are blind and are unable to anticipate future states of the vehicle that are liable to cause situations in which vehicle driving limits are violated, such as emergency braking or excess speed in turns.

Thus, provision is made to supply a model 16 for predicting the dynamic behavior of the vehicle with, on the one hand, information relating to the dynamic behavior of the vehicle and, on the other hand, information relating to the road layout, so that the model 16 can use this information to predict future states of the vehicle.

This prediction model 16 is therefore sensitive to vehicle state signals comprising the vehicle lateral speed, the vehicle longitudinal speed, the vehicle yaw rate and the steering angle, and to the information relating to the road layout and more particularly the curvature of the trajectory, in order to make it possible to predict, as model output, a set of vehicle positions corresponding to future states of the vehicle, up to the electronic horizon. The electronic horizon is formed from a set of information relating to the road environment into which the vehicle is liable to move in the near future, i.e. in practice as far as the maximum visibility permitted by the onboard detection device.

Each of these future positions is associated with a vehicle steering, accelerator, and braking command, which makes it possible to assess whether one of these future positions is outside of vehicle driving limits.

The vehicle prediction model is determined as follows:

$$|X_v = A_v + B_v u_v$$

$$Y_v = C_v X_v$$

where $u_v$ is the steering wheel angle command and $X_v$ is the state vector, defined as follows:

$$X_v = [y_v, v_y, \psi_v, \omega_v]$$

where $y_v$ is the vehicle lateral position, $v_y$ is the vehicle lateral speed, $\psi_v$ is the vehicle yaw angle, and $\omega_v$ is the vehicle yaw rate.

The matrices A, B and C are described below:

$$A_v = \begin{bmatrix} 0 & 1 & 0 & 0 \\ 0 & \frac{-(C_f + C_r)}{mv_x} & 0 & \frac{-aC_f + bC_r}{mv_x} - v_x \\ 0 & 0 & 0 & 1 \\ 0 & \frac{-aC_f + bC_r}{I_z v_x} & 0 & \frac{-a^2 C_f - b^2 C_r}{I_z v_x} \end{bmatrix}$$

$$B_v = \begin{bmatrix} 0 & \frac{C_f}{m} & 0 & \frac{aC_f}{I_z} \end{bmatrix}^T$$

$$C_v = [0 \ 0 \ 0 \ 1]$$

where $C_f$ and $C_r$ correspond to the cornering stiffness at the front and rear wheels, respectively, $v_x$ is the speed of the vehicle, m is the mass of the vehicle, $I_z$ is the moment of inertia about the vertical axis Z, and a and b are the distances from the center of gravity of the vehicle to the front and rear wheels, respectively.

This vehicle-specific dynamic model can be connected to a descriptive model of tire behavior developed on the basis of the model proposed by PACEJKA or the like, to include the stability limits.

The output of the model 16 is connected to a module 17 for determining the future states of the vehicle in which the future positions of the vehicle are calculated. More specifically, this module 17 uses the current speed of the vehicle, the position and orientation of the vehicle, the wheelbase and the angle of the steering wheel to calculate the first iteration. Next, for the future states, the prediction model 16 is run forward, taking into account the closed-loop response of a prediction regulator 18 of the vehicle, which provides the same response as the regulators implemented in the devices 12 and 13 for controlling the longitudinal and lateral movement of the vehicle. Thus, the future positions of the vehicle are estimated using the same control strategy as that which will be applied later on by the devices for controlling the longitudinal and lateral movement of the vehicle to said positions.

Thus, the input values are the predicted control commands provided by the regulator 18, collected at the beginning of the current iteration, and the state values are the components of the updated state vector $X_v$ characterizing the state of the system at the previous iteration.

The output of the module 17 for determining the future states of the vehicle is thus provided first to the prediction regulator 18 of the vehicle which, as indicated above, is equivalent to the devices 12 and 13 for controlling the longitudinal and lateral movement of the vehicle. The main difference is that the output of the prediction regulator is also used to supply the prediction model 16, so as to allow the future states of the vehicle across the entire electronic horizon to be covered by the prediction.

The output of the module 17 for determining the future states of the vehicle is also delivered to a module 19 for determining the violation of vehicle driving limit values. This module 19 includes all of the physical limits from either the actuators of the vehicle or the dynamics of the vehicle itself. It takes into account the maximum steering wheel angle, the maximum steering wheel angle speed, the maximum braking capability and the maximum acceleration capability. It monitors all of the future states of the vehicle with respect to these maximum values and is designed to raise an indicator flag when one of these future states exceeds the limits of the vehicle.

The module 19 for determining the violation of vehicle driving limits is connected to the module 15 for managing the driving assistance systems of the vehicle. The latter thus receives the current outputs of the control devices 12 and 13 and the outputs of the prediction regulator with the violation indicators. It makes it possible to modify the dynamic behavior of the vehicle by reacting in advance according to the future states for which an indicator of violation of vehicle driving limits has been raised.

Figure 2:
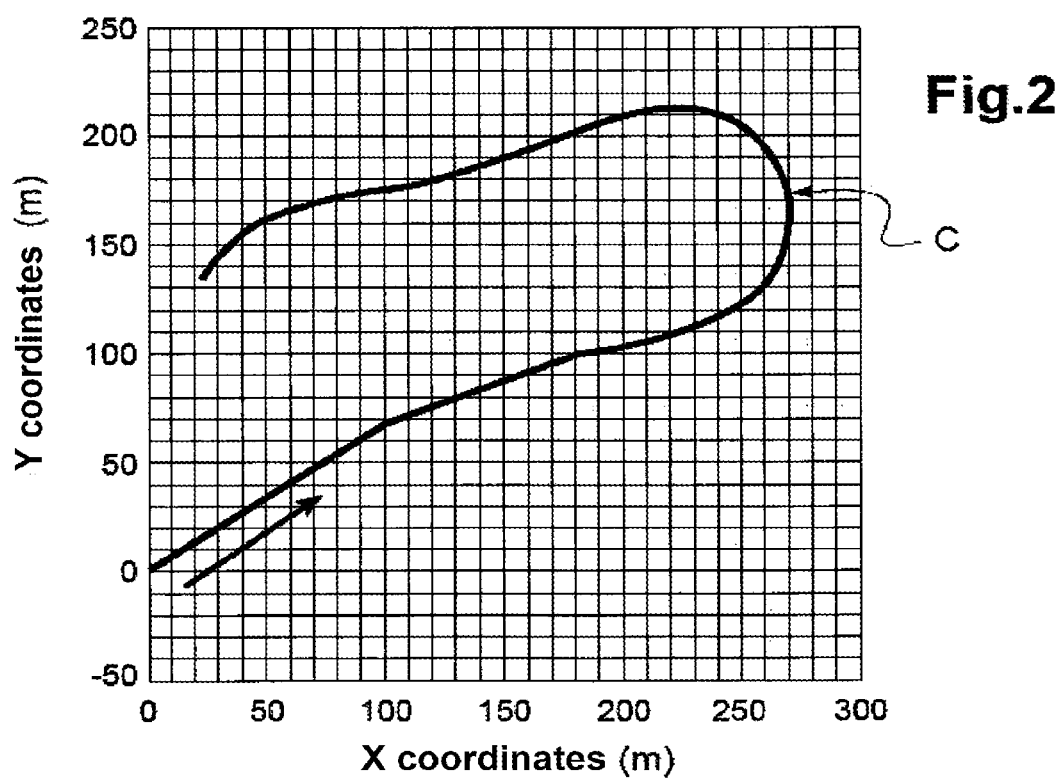
FIG. 2 is a graph illustrating an example of a trajectory of the vehicle on which the control device of the invention is evaluated.
Figure 3A:
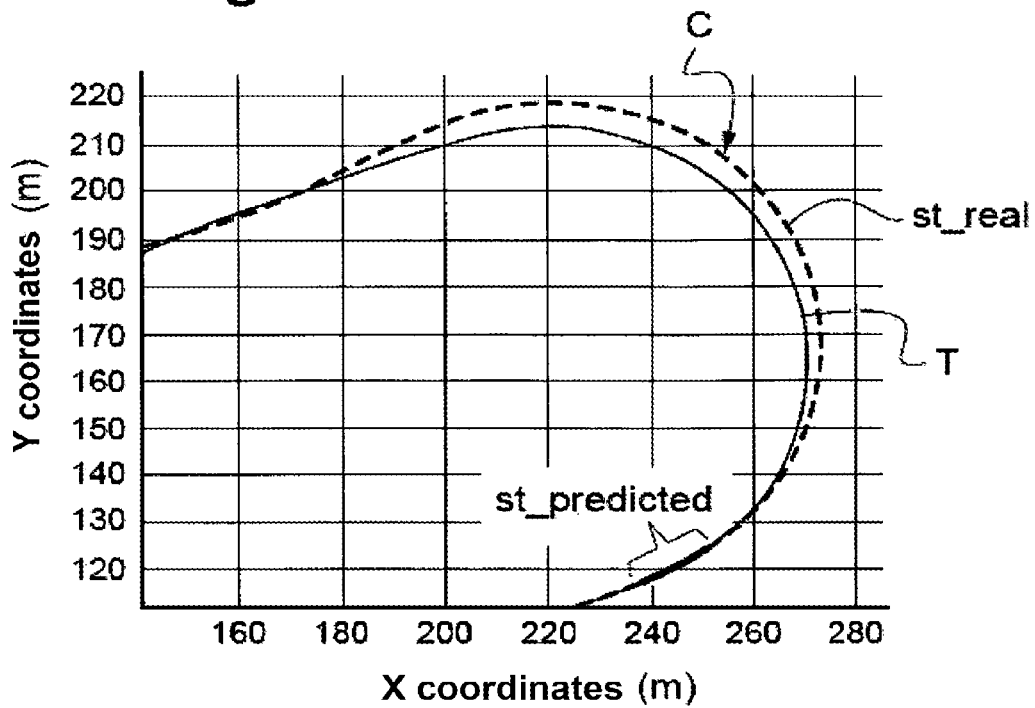
FIG. 3A is a graph of the trajectory portion formed by the pronounced curve illustrated in FIG. 2, illustrating the change in the actual and predicted states of the vehicle on this trajectory portion.
Figure 3B:
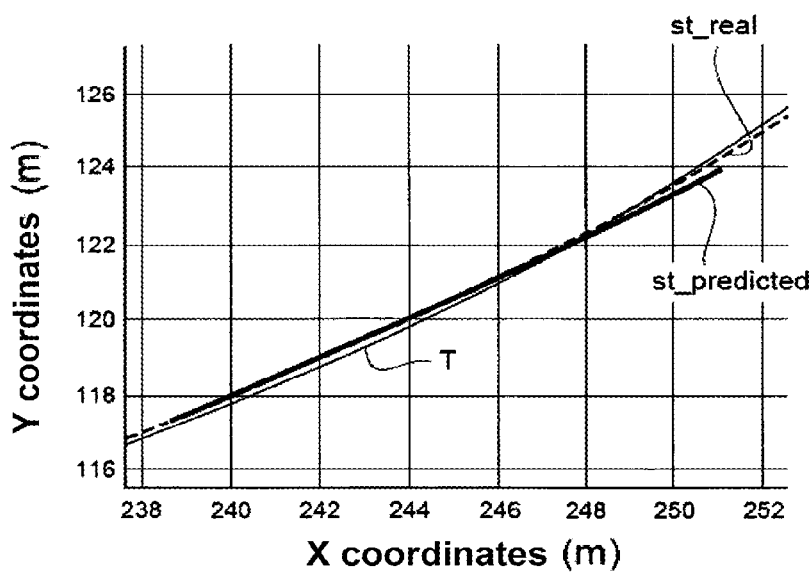
FIG. 3B is a detail view of the entry into the curve of FIG. 3.

The following example illustrates the principles that have just been described. FIG. 2 illustrates, on X and Y coordinates, an example of a specific trajectory in which a pronounced curve C is taken. The whole trajectory is followed by a vehicle equipped with a device 1 for controlling the movement of the vehicle as described above with reference to FIG. 1. FIGS. 3A and 3B more precisely show the exact moment when the prediction model of the vehicle detects actuator control signals or future states of the vehicle that are outside of a controllable range, i.e. that reach or exceed a driving limit value of the vehicle. FIG. 3A shows the trajectory portion at the pronounced curve C of FIG. 2, while FIG. 3B is a detail view of the entry into the pronounced curve C. FIG. 3A shows the trajectory T to be followed by the vehicle, the actual states of the vehicle st_real as determined by the onboard sensors, and the future or predicted states of the vehicle st_predicted provided by the prediction model 16. The vehicle will therefore follow the trajectory defined by the set of actual states of the vehicle st_real, but the prediction model is capable of detecting in advance, for example 800 ms before, future states of the vehicle that are outside of the controllable range, which are represented by the end of the line st_predicted.

Figure 4:
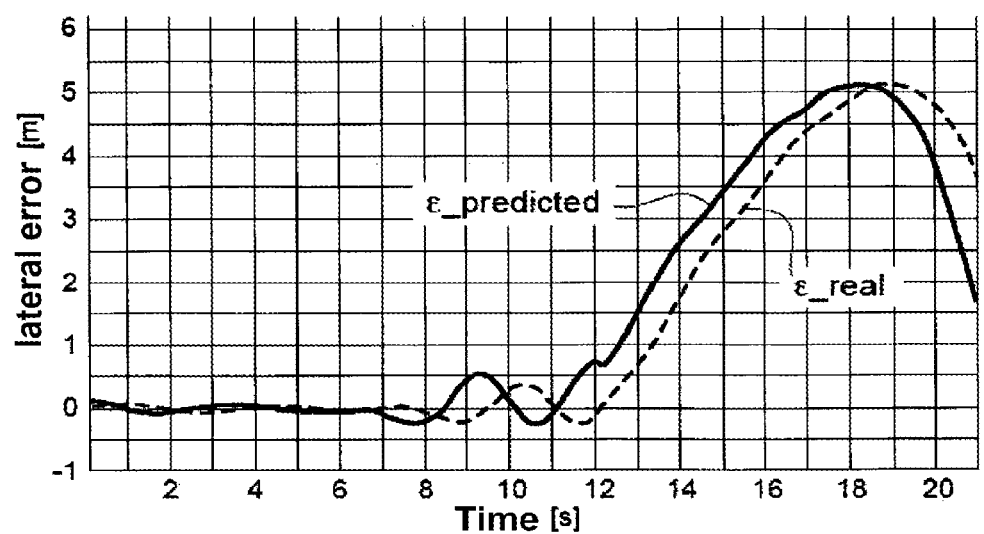
FIG. 4 is a graph illustrating the variations over time in the lateral error of the actual and predicted states of the vehicle with respect to the trajectory to be followed, throughout the course of FIG. 2.

FIG. 4 shows the lateral error in meters of the vehicle with respect to the trajectory to be followed, throughout the course of FIG. 2. The curve ε_real represents the lateral error of the actual states of the vehicle with respect to the trajectory to be followed and the curve ε_predicted represents the lateral error of the predicted states of the vehicle 800 ms in advance with respect to the trajectory to be followed. Around the twelfth second, lateral errors of more than 1 meter appear, meaning that the vehicle departs from the controllable range.

Figure 5:
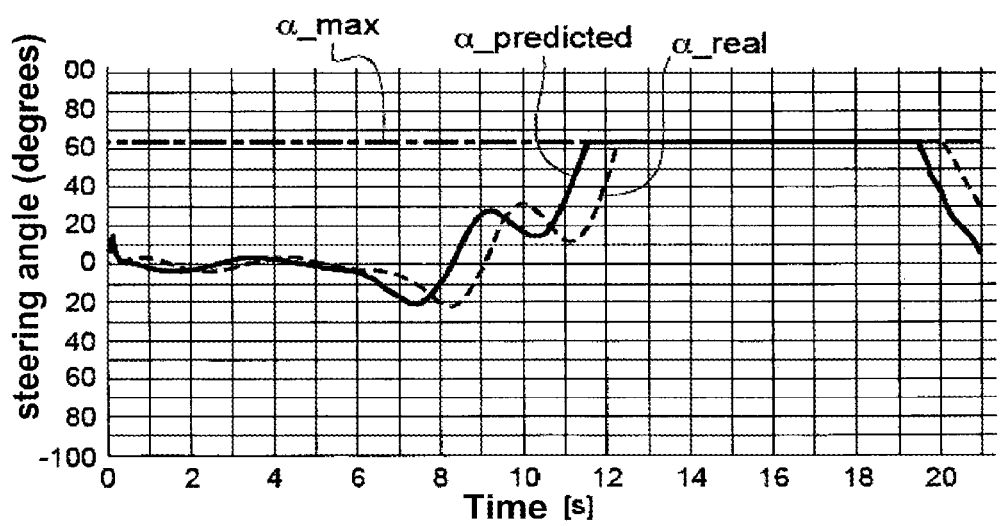
FIG. 5 is a graph illustrating the variations over time in the actual steering angle of the steering wheel and in the predicted angle, with respect to a maximum value of the steering angle of the steering wheel.

FIG. 5 shows the behavior of the steering wheel steering angle α_real resulting from the actual state of the vehicle and from the predicted angle α_predicted, as a function of time, as well as the maximum value α_max of the steering wheel steering angle provided by the electric power steering system, set to about 65°. In this example, by virtue of the prediction, the vehicle can detect the steering wheel steering angle states that reach the maximum controllable value before they occur and make decisions accordingly. FIG. 5 illustrates the advance in time of the predicted states of the vehicle which, later on, will correspond to the actual states of the vehicle. Thus, the prediction model makes it possible to determine in advance the future states of the vehicle that correspond to potentially dangerous situations in which the steering angle reaches the maximum value.

Figure 6:
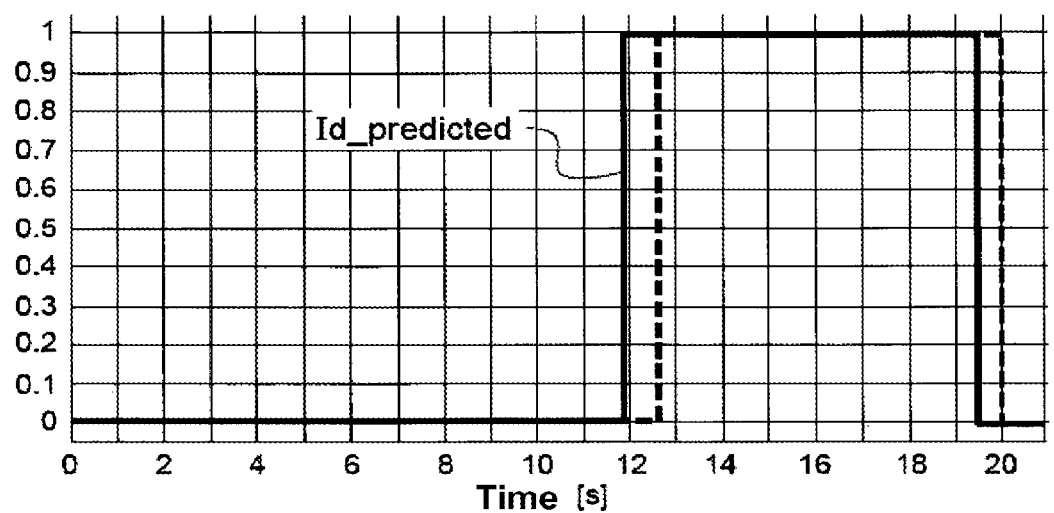
FIG. 6 is a graph illustrating the corresponding output of the module for determining violation of vehicle driving limit values.

FIG. 6 illustrates the corresponding output of the module for determining violation of vehicle driving limits. Thus, the raising of the violation indicator ld_predicted shows when the module for determining violation of vehicle driving limits detects that the future state of the vehicle with respect to the steering wheel steering angle violates the maximum allowed limit value. Such an alert may be issued for one or more predicted state variables of the vehicle outside of its controllable range. In the example presented here, the raising of the indicator ld_predicted makes it possible to inform the module 15 for managing the driving assistance systems acting on the future change in the steering angle about 0.8 second before the actual state occurs. The module 15 for managing the driving assistance systems of the vehicle is then able to act and prevent this situation in advance, by controlling an anticipatory corrective action with the aim of preventing the steering angle from violating the maximum allowable limit value. Such an anticipatory corrective action may, for example, be a slight braking and/or steering action. Thus, the invention makes it possible to increase the safety of the vehicle by anticipating future states of the vehicle in which its stability limits might be exceeded, and adopting appropriate safety strategies in advance.

The invention claimed is:

1. A device for controlling a movement of a motor vehicle on a road, comprising:
a module configured to manage at least one driving assistance system;
an onboard device configured to detect ground markings for traffic lanes, configured to provide first information relating to a road layout according to the detected ground markings;
a set of onboard measurement sensors configured to provide second information relating to a dynamic behavior of the motor vehicle;
a device configured to control a longitudinal movement of the motor vehicle and a device configured to control a lateral movement of the motor vehicle, which are configured to generate, from the first and second information, control commands for the longitudinal movement and for the lateral movement sent to actuators for longitudinal and lateral control of a steering system of the motor vehicle; and
a model configured to predict the dynamic behavior of the motor vehicle supplied with the first and second information, which is configured to determine a set of future states of the motor vehicle corresponding to future positions of the motor vehicle over a plurality of iterations defining an upcoming road portion, said prediction model being connected to a module configured to determine a violation of vehicle driving limit values, which is configured to determine, for each determined future state, when at least one of state variables defining said future state of the motor vehicle reaches or exceeds the vehicle driving limit value, and configured to infer therefrom an upcoming risk situation for the motor vehicle for at least one future state of the motor vehicle,
wherein the module configured to determine the violation of the motor vehicle driving limit values includes, among parameters defining a motor vehicle driving limit value, physical parameters relating to said actuators and/or to the dynamics of the motor vehicle,
wherein said parameters comprise at least a maximum steering angle value, a maximum steering wheel angle speed value, a value representative of a maximum braking capability, and a value representative of a maximum acceleration capability of the motor vehicle, and
wherein the module configured to determine the violation of the motor vehicle driving limits is configured to compare the determined future states of the motor vehicle with respect to the vehicle driving limit values and to generate an alert signal as soon as at least one of the state variables defining the future states reaches a corresponding driving limit value.

2. The device as claimed in claim 1, wherein the driving assistance system is an electronic stability program.

3. The device as claimed in claim 1, wherein the model configured to predict the dynamic behavior of the motor vehicle receives as input predicted control commands for the actuators of the motor vehicle delivered by a regulator equivalent to devices to control the longitudinal movement and the lateral movement of the motor vehicle, the state variables of the future state of the motor vehicle determined during a current iteration, and its current states, which are a lateral position of the motor vehicle, a lateral speed of the motor vehicle, a yaw angle and a yaw rate of the motor vehicle.

4. The device as claimed in claim 1, wherein the module configured to manage the driving assistance system is configured to receive said generated alert signal and, upon receiving said generated alert signal, to control an anticipatory corrective action for a state variable.

5. The device as claimed in claim 4, wherein said anticipatory corrective action comprises a braking and/or steering action.

6. A motor vehicle, comprising:
the device as claimed in claim 1.

* * * * *